United States Patent Office
3,658,773
Patented Apr. 25, 1972

3,658,773
PROCESS FOR THE PRODUCTION OF HIGH MOLECULAR WEIGHT POLYAMIDE-IMIDES AND THE PRODUCT
Wilfried Zecher, Cologne-Stammheim, and Rudolf Merten, Leverkusen, Germany, assignors to Farbenfabriken Bayer Aktiengesellschaft, Leverkusen, Germany
No Drawing. Filed Apr. 4, 1969, Ser. No. 813,708
Claims priority, application Germany, Apr. 13, 1968, P 17 70 202.7
Int. Cl. C08g 20/32
U.S. Cl. 260—78 L    5 Claims

ABSTRACT OF THE DISCLOSURE

Process for the production of high molecular weight polyamide-imides by reaction of
(a) a lactam,
(b) an organic isocyanate and
(c) a cyclic dicarboxylic acid anhydride
containing at least one additional functional group capable of condensation or addition reaction. The polyamide-imides produced are suitable for use as heat resistant plastics.

This invention relates to a process for the production of high molecular weight polyamide-imides by reacting lactams, acid anhydrides and isocyanates.

It is already known that polyamide-imides can be obtained by reacting aliphatic or aromatic diamines with dicarboxylic acid anhydride-carboxylic acid chlorides, for example, with trimellitic acid anhydride chloride. One disadvantage of this process is that to neutralise the hydrogen halide evolved during the reaction it is necessary to add acid acceptors, whose salts detrimentally affect the polymer and can only be removed by difficult and complicated purification operations which, in many instances, produced a deterioration in the mechanical properties through dissociation or rearrangement reactions.

The polyamide-imides are used, for example, as lacquers and insulating films in electrical engineering because numerous materials of this type are distinguished by their outstanding resistance to heat.

It is an object of this invention to provide a process for the production of high molecular weight polyamide-imides which avoids the disadvantages mentioned above. This object is accomplished by a process for the production of high molecular weight polyamide-imides, which comprises reacting (a) a lactam, (b) an organic compound selected from the group consisting of an organic isocyanate and a masked organic isocyanate, and (c) a cyclic dicarboxylic acid anhydride containing at least one additional functional group capable of condensation or addition reaction, said reacting being carried out at a temperature of from —20 to +450° C. This process can be carried out optionally in the presence both of a solvent and of a catalyst.

It is possible in this way to obtain high molecular weight polyamide-imides containing the recurring structural unit:

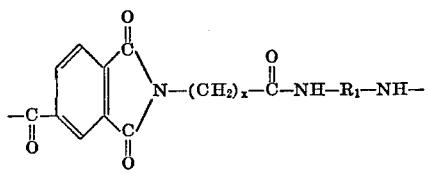

and/or the recurring structural element:

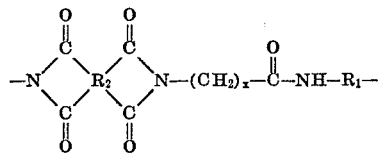

in which $R_1$ represents an alkylene, cycloalkylene, phenylene or naphthylene radical which may optionally be substituted by alkyl radicals or by halogen.

$R_2$ represents a tetravalent organic radical and
$x$ represents an integer from 2 to 20.

In the above formula, the radical $R_2$ may, for example, be the radical of a tetracarboxylic acid of benzene, naphthalene, diphenyl methane, diphenyl ether, diphenyl thioether, diphenyl sulphone, azobenzene, benzophenone, N, N'-diphenyl urea, cyclopentadiene, pyridine or of a compound corresponding to the formula:

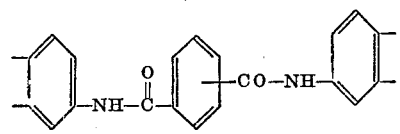

It is possible by the process according to the invention to replace the polyamines, which have hitherto been used in the production of polyamide-imides and which are often difficult to purify and sensitive to oxidation, by the polyisocyanates which can usually be distilled. Since the only low molecular weight reaction product evolved during the process according to the invention is carbon dioxide, there is now no need for purification operations which, in addition to their cost, are accompanied by chain breakages and hence by deterioration in the mechanical properties of the polymers. The average molecular weights of the polymers may be varied within wide limits in dependence both upon the duration of heating and upon the stoichiometric ratios used.

Since no water is formed during condensation, hydrolysis reactions are avoided. In contrast to the reaction of acid anhydrides with isocyanates, secondary reactions, for example crosslinking reactions, occur only to a negligible extent, and predominantly high molecular weight condensation products are obtained with a limited degree of branching which are distinguished by their particularly high solubility.

Lactams suitable for use in the process according to the invention include lactams corresponding to the general formula:

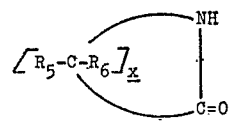

in which $R_5$ and $R_6$ are the same or different and represent hydrogen or optionally substituted alkyl, aryl or aralkyl radicals, whilst $x$ represents an integer from 2 to 20.

In addition to hydrogen, $R_5$ and $R_6$ preferably represent methyl, propyl, dodecyl, propenyl, butinyl, cyclohexyl, phenyl, toluyl, o-, m- or p-xylyl or naphthyl. They may also be mono- or poly-substituted by alkyl, aryl, halogen, cyano or nitro groups.

The following are examples of suitable lactams:

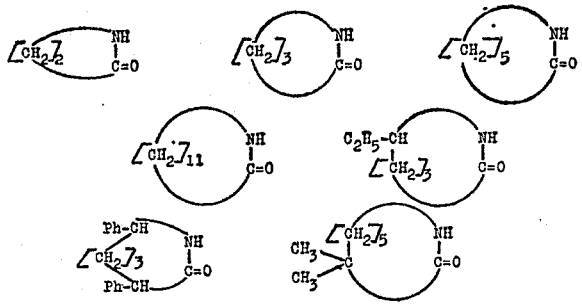

It is preferred to use caprolactam or ω-aminododecanic acid lactam.

Suitable cyclic dicarboxylic acid anhydrides containing at least one additional functional group capable of condensation or addition, include compounds of the general formula:

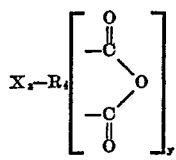

wherein $R_4$ represents an optionally substituted aliphatic, aromatic or aliphatic-aromatic radical, X represents the radical:

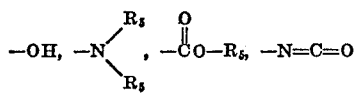

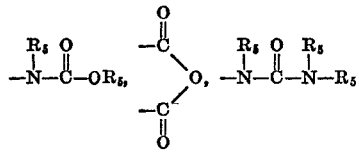

—$SO_3$—$R_5$ or

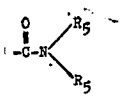

in which $R_5$ is as defined above, while z and y represent integers from 1 to 3.

$R_4$ is preferably derived from ethane, n-, iso- or tert.-butane, hexane, eicosane, propene, butine, diethyl ether, dipropyl sulphide, cyclopentane, cyclohexane, benzene, naphthalene, diphenyl, diphenyl methane, diphenyl sulphone, diphenyl ether, 4,4'-diphenoxy diphenyl propane, toluene, o-, m- or p-xylene, tris-tolyl methane, ethylene glycol bisphenyl carboxylic acid ester, triaryl phosphate, polyethers, polyesters, polyhydantoins, polyacetals, polyureas, polyurethanes, polyimides or polyamides. They may be mono- or poly-substituted, for example, by alkyl, halogen, nitro, alkoxy, aryloxy or cyano groups. The following are examples of such compounds:

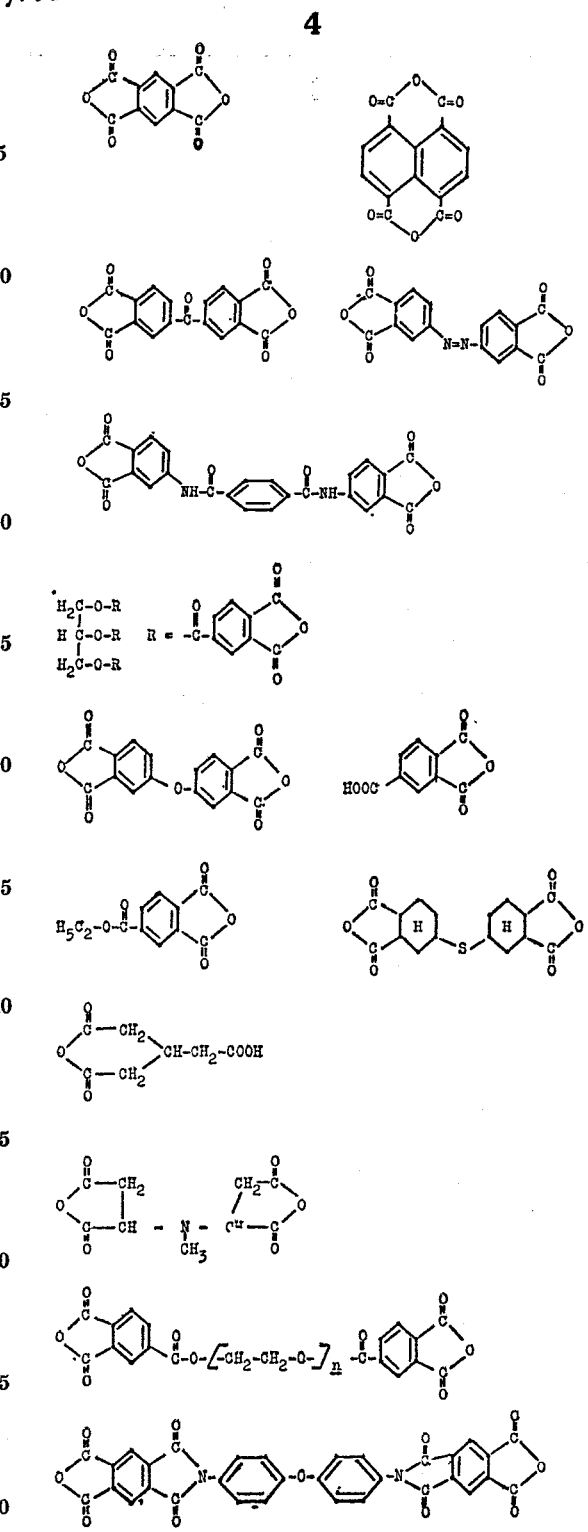

In the context of this invention by the expression carboxylic acid anhydrides there are meant also compounds, for example, o-dicarboxylic acids or their phenyl esters, which can be converted during the reaction into carboxylic acid anhydrides. It is preferred to use trimellitic acid anhydride, pyromellitic acid anhydride or azo-4,4'-bis-phthalic acid anhydride.

Organic isocyanates suitable for use in the process according to the invention include those which correspond to the general formula:

$$X_z—R_1[NCO]_n$$

wherein $R_1$ represents an optionally substituted aliphatic, aromatic or aliphatic-aromatic radical, n represents an integer from 1 to 3 and X and z are as defined above. $R_1$ preferably has the same meaning as $R_4$.

The following are examples of such isocyanates:

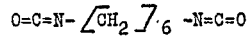 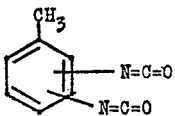

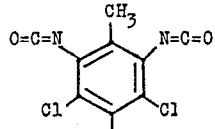 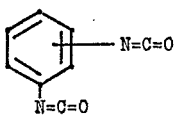

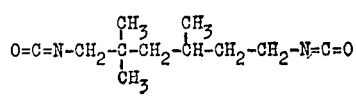

It is preferred to use 4,4′-diphenylmethane diisocyanate, 2,4-tolylene diisocyanate or hexamethylene diisocyanate.

Instead of the isocyanates, it is also possible to use isothiocyanates or compounds that react as isocyanates under the reaction conditions, for example masked isocyanates such as the addition products of phenols, hydrocyanic acid and CH-acid compounds, for example of cyclohexanone. Particular emphasis is also laid upon the adducts of lactams, for example caprolactam, with isocyanates. It is also possible to use derivatives of isocyanates which, like ureas and alkyl carbamic acid esters, can be reacted with cyclic acid anhydrides into imides and with carboxylic acids into amides, as starting materials for the reaction according to the invention.

The process according to the invention is illustrated by the following general reaction scheme:

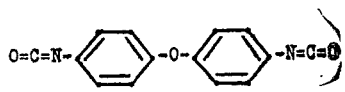

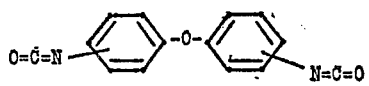 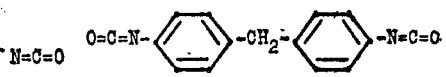

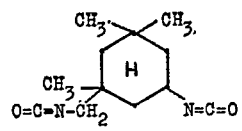 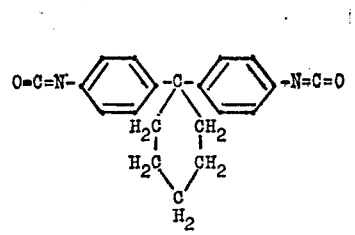

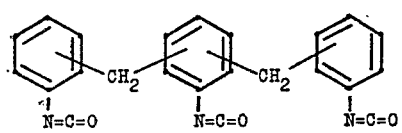

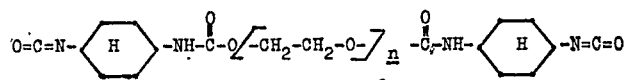

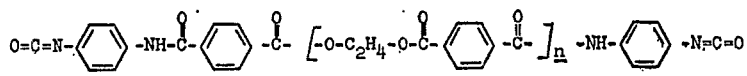

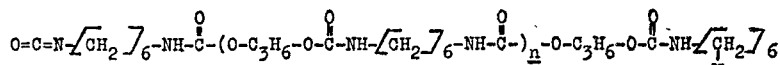

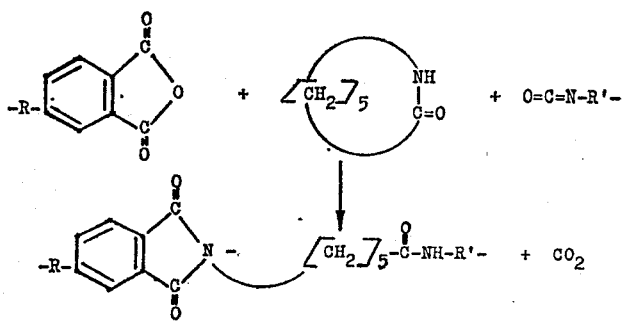

When at least bifunctional isocyanates and bifunctional acid anhydrides are used as starting materials, the monomers or oligomers are linked together to the high molecular weight compounds simply through amide and imide groups. It is also possible, however, to synthesise the high molecular weight compounds from one monofunctional and one bifunctional or from two monofunctional components, which in this instance must contain at least one other functional group capable of condensation or addition. Thus, polyamide-imides with a varied amide-imide ratio are obtained, for example, from diphenylmethane-4,4'-diisocyanate, caprolactam and trimellitic acid anhydride.

Another method of synthesising high molecular weight compounds from lactams, monofunctional acid anhydrides and isocyanates with a second reactive group is to add other polyfunctional substances, for example diamines, polyesters or polyethers with terminal acid groups, diols, trils, amine alkanols or polycarboxylic acids. For example, the corresponding polyamide-imide ester is obtained from dodecanic acid lactam, trimellitic acid anhydride, tolylene-2,4-diisocyanate and hexane diol.

The reaction according to the invention may be carried out in organic solvents which do not react with the components under the reaction conditions. Suitable solvents include hydrocarbons, halogenated hydrocarbons, phenols, esters, ketones, ethers, substituted amides, sulphoxides and sulphones, for example xylene, o-dichloro benzene, phenol, cresol, acetophenone, ethylene glycol monomethyl ether acetate, N-methyl pyrrolidone, dimethyl formamide, dimethyl sulphoxide, dimethyl sulphone and mixtures thereof. It is preferred to use cresol or dimethyl acetamide.

To carry out the process according to the invention, the reaction components are reacted by keeping them for periods ranging from a few minutes up to several hours at temperatures of from $-20$ to $+450°$ C. and preferably at temperatures of from 0 to $350°$ C., optionally in the presence of one of ten solvents mentioned. The end of the reaction is shown by the cessation in the evolution of gas and by the increasing viscosity. In some instance, it is of advantage to carry out the reaction in several stages. Thus, an adduct or condensate may be prepared in a first stage and then subsequently converted at elevated temperatures into a high molecular weight polyamide-imide, optionally accompanied by chain extension or crosslinking. In some instances, it is advisable to conduct the reaction in the presence of an inert protective gas, such as nitrogen or argon.

As a rule, it is of advantage to select the quantitative ratios between the reaction components in such a way that they are equivalent to the reactive groups, although substantial deviations from these stoichiometric ratios are possible. The reaction according to the invention can be accelerated by suitable catalysts, for example by boron fluoride and its adducts, mineral acids, carboxylic acids, zinc chloride, stannous chloride, ferric chloride, cobalt acetate, triethylene diamine, phenyl methyl phospholine oxide, trialkyl phosphine, potassium acetate, zinc octoate, dialkyl tin diacylates, titanium tetrabutylate and lead oxide. The lactams catalyse the reaction between isocyanates and carboxylic acids or carboxylic acid anhydrides.

The products obtaindale by the process according to the invention are distinguished by their outstanding resistance to high temperatures and are generally suitable for use as heat resistant plastics, for example, lacquers, films and shaped articles. Their properties may be varied to satisfy the requirements of the various fields in which they are used by modifying the stoichiometric ratios, the degree of concentration and, on addition of fillers, pigments and low molecular weight and high molecular weight additives, for example, for the production of wire enamels by admixture with polyesters.

The following examples are to further illustrate the invention without limiting it.

The cresol used as solvent in the examples is an isomer mixture of the kind formed in large-scale practice.

EXAMPLE 1

125 g. of diphenylmethane-4,4'-diisocyanate, 96 g. of trimellitic acid anhydride and 57 g. of caprolactam are slowly heated to $150°$ C. in 290 g. of cresol. The reaction mixture is kept at this temperature until, after 2 hours, the initial vigorous evolution of carbon dioxide has abated, after which the temperature is raised over a period of 1 to 2 hours to $200°$ C. The mixture is then stirred for another 10 hours at this temperature. A highly viscous solution of the condensate is obtained which, while still hot, is diluted with 290 g. of cresol and then stoved on glass or metal plates first for 20 minutes at $200°$ C. and then for 20 minutes at $300°$ C. to form clear elastic lacquer films with outstanding mechanical properties. The infra-red spectrum shows the bands characteristic of imides at 1725 and 1778 cm.$^{-1}$, and the bands characteristic of amides at 1675$^{-1}$.

EXAMPLE 2

A mixture of 174 g. of tolylene-2,4-diisocyanate, 113 g. of caprolactam, 192 g. of trimellitic acid anhydride and 480 g. of cresol are stirred at 190 to $200°$ C. until there is no further evolution of carbon dioxide. The viscous solution is mixed with 250 g. of a polyester of terephthalic acid, ethylene glycol and glycerol and 980 g. of cresol and is then stoved at $200°$ C. and $300°$ C. yield light brown elastic lacquers.

EXAMPLE 3

161 g. of azo-4,4'-bis-phthalic acid anhydride, 84 g. of hexamethylene diisocyanate and 98 g. of ω-amino dodecanic acid lactam are heated with stirring for 8 hours at $190°$ C. in 680 g. of cresol. A tough clear lacquer film is obtained after stoving at $190°$ C. and $250°$ C.

EXAMPLE 4

250 g. of diphenylmethane-4,4'-diisocyanate, 192 g. of trimellitic acid anhydride and 226 g. of caprolactam in 670 g. of cresol are stirred for 4 hours at $140°$ C. and then at $200°$ C. until condensation is finished. The reaction reaches its conclusion when the solid components precipitated during the reaction have re-dissolved and when there is no further evolution of gas. The solution is diluted with 700 g. of cresol and stoved at 200° C. and 250° C. to yield clear lacquer films.

EXAMPLE 5

174 g. of tolylene-2,4-diisocyanate, 113 g. of caprolactam, 192 g. of trimellitic acid anhydride and 960 g. of cresol are heated with stirring for 4 hours at 150° C. and then to 200° C. until no more gas is evolved. A clear solution is obtained to which 31 g. of glycol, 0.4 g. of lead oxide and 0.8 g. of zinc octoate are added, followed by heating for 2 hours at 190° C. Stoving at 200° C. and 300° C. gives clear elastic films.

EXAMPLE 6

56 g. of caprolactam and 12.4 g. of ethylene glycol are introduced into 300 g. of cresol, followed by the addition of 125 g. of diphenylmethane-4,4'-diisocyanate. The reaction mixture is stirred for 1 hour at 90° C. and then 134 g. of trimellitic acid anhydride, 0.2 g. of lead oxide and 0.6 g. of zinc octoate are added. It is then slowly heated to 150° C., and stirred at this temperature for 4 hours, and condensation is completed by heating for 10 hours at 200° C. The viscous solution of the polyamide-imide ester is stoved at 200° C. and 300° C. to form clear tough lacquers. Its infra-red spectrum shows the bands characteristic of imides at 1720 and 1775 cm.$^{-1}$, the bands characteristic of amides at 1673 cm.$^{-1}$ and the bands characteristic of esters at 1736 cm.$^{-1}$.

EXAMPLE 7

174 g. of tolylene-2,4-diisocyanate, 113 g. of caprolactam and 192 g. of trimellitic acid anhydride are heated in 480 g. of cresol first at 150° C. and then at 200° C. until there is no further evolution of gas. The solution is then diluted with 100 g. of xylene and 450 g. of cresol. Stoving at 190° C. and 300° C. gives hard, dark brown lacquer films.

EXAMPLE 8

125 g. of diphenylmethane-4,4'-diisocyanate, 96 g. of trimellitic acid anhydride and 11.3 g. of caprolactam are stirred in 460 g. of dimethyl acetamide for 6 hours at 80° C. and then for 6 hours at 120° C. A dark yellow solution of low viscosity is obtained which is stoved at 200° C. and 300° C. yield films of high tensile strength, elasticity and hardness.

EXAMPLE 9

136 g. of an isocyanate with an isocyanate content of 30.9% obtained by phosgenating a condensation product of aniline and formaldehyde, 96 g. of trimellitic acid anhydride, and 56 g. of caprolactam are heated with stirring for 12 hours at 180° C. in 580 g. of cresol. Stoving at 200° C. and 300° C. gives a clear hard lacquer film whose infra-red spectrum shows the bands characteristic of imides at 1715 and 1775 cm.$^{-1}$ and the bands characteristic of amides at 1685 cm.$^{-1}$.

What we claim is:
1. High molecular weight film-forming polyamide-imides consisting essentially of a recurring structural unit selected from the group consisting of

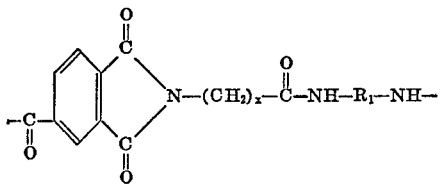

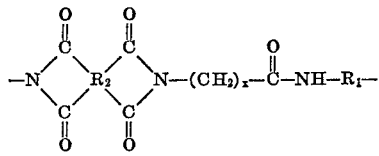

wherein
$R_1$ represents a radical selected from the group consisting of an alkylene a cycloalkylene, a phenylene, a naphthylene radical, and wherein said radical $R_1$ may contain an alkyl substituent;
$R_2$ is an aromatic carbocyclic radical; and
$x$ represents an integer from 5 to 20.

2. The polyamide-imides of claim 1 wherein $R_1$ is unsubstituted.

3. A process for the production of high molecular weight, film-forming polyamide-imides, which comprises reacting
(a) a lactam having at least six carbon atoms in the lactam ring;
(b) an organic compound selected from the group consisting of an organic bis-functional isocyanate and a masked organic bis-functional isocyanate; and
(c) a cyclic dicarboxylic acid anhydride containing at least one additional functional group selected from the group consisting of

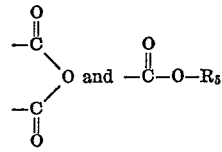

in which $R_5$ represents hydrogen or optionally substituted alkyl, aryl or aralkyl radicals
said reaction being carried out at a temperature of from −20 to +450° C.

4. The process of claim 3 wherein said reacting is carried out in the presence of an organic solvent selected from the group consisting of xylene, ortho dichlorobenzene, phenol, cresol, acetophenone, ethylene glycol monomethylether acetate, N-methylpyrrolidone, dimethylformamide, dimethylsulfoxide, dimethylsulfone and mixtures thereof.

5. The process of claim 3 wherein said reacting is carried out in the presence of a catalyst selected from the group consisting of boron fluoride and its adducts, mineral acids, carboxylic acids, zinc chloride, cobalt acetate, triethylene diamine, phenylmethylphospholine-oxide, trialkylphosphine, potassium acetate, zinc octoate, dialkyltin-diacylates, titanium tetrabutylate, stannous chloride, ferric chloride and lead oxide.

References Cited
UNITED STATES PATENTS

| | | | |
|---|---|---|---|
| 3,238,181 | 3/1966 | Anderson | 260—78 |
| 3,290,350 | 12/1966 | Hoover | 260—78 |
| 3,300,420 | 1/1967 | Frey | 260—78 |
| 3,314,923 | 4/1967 | Muller et al. | 260—78 |
| 3,179,632 | 4/1965 | Hendrix | 260—78 TF |

HAROLD D. ANDERSON, Primary Examiner

U.S. Cl. X.R.

117—124 E, 161 P; 260—18 N, 30.2, 30.8 DS 32.6 R, 32.8 N, 33.4 R, 33.6 R, 33.8 R, 47 CZ, 47 CB, 65, 75 N, 77.5 C, 77.5 AT, 78 A, 78 P, 78 TF